(12) United States Patent  (10) Patent No.: US 8,677,418 B2
Wong  (45) Date of Patent: Mar. 18, 2014

(54) METHOD AND SYSTEM FOR ELECTRONIC COMMUNICATION TO TELEVISION

(75) Inventor: Ling Jun Wong, Escondido, CA (US)

(73) Assignee: Sony Corporation, Tokyo (JP)

(*) Notice: Subject to any disclaimer, the term of this patent is extended or adjusted under 35 U.S.C. 154(b) by 217 days.

(21) Appl. No.: 13/005,412

(22) Filed: Jan. 12, 2011

(65) Prior Publication Data

US 2012/0180092 A1  Jul. 12, 2012

(51) Int. Cl.
*H04N 5/445* (2011.01)
*H04N 7/16* (2011.01)
*H04N 7/173* (2011.01)

(52) U.S. Cl.
USPC .................. 725/51; 725/111; 725/136

(58) Field of Classification Search
USPC ............................. 725/51, 111, 136
See application file for complete search history.

(56) References Cited

U.S. PATENT DOCUMENTS

| 7,636,578 | B1 | 12/2009 | Cope et al. |
| 2003/0226143 | A1 | 12/2003 | Michael et al. |
| 2005/0091694 | A1* | 4/2005 | Rambo ......................... 725/110 |
| 2007/0250886 | A1 | 10/2007 | Chouraqui |
| 2009/0207984 | A1* | 8/2009 | Lafreniere et al. ......... 379/88.23 |
| 2010/0046528 | A1* | 2/2010 | Foti .............................. 370/401 |
| 2011/0142210 | A1* | 6/2011 | Detering et al. ........... 379/88.13 |

* cited by examiner

*Primary Examiner* — Dominic D Saltarelli
(74) *Attorney, Agent, or Firm* — John L. Rogitz

(57) ABSTRACT

A system and method of displaying messages at a television is described. The method of displaying messages at a television includes: establishing communication over the Internet between a television and a server. A user-generated communication is received at the television from the server. A notification is displayed on the television that the user-generated communication has been received. The user-generated communication is displayed on the television.

15 Claims, 8 Drawing Sheets

METHOD AND SYSTEM FOR ELECTRONIC COMMUNICATION TO TELEVISION

FIELD

Embodiments according to the present invention generally relate to television systems and more specifically digital television systems.

BACKGROUND

As technology advances, televisions have quickly evolved in order to provide users with a number of programming options. For example, older televisions could only receive programming through antenna. As technology progressed, televisions were then able to receive programming through cable. Next, televisions were able to receive programming from satellite. All of these programming delivery methods used the television as an isolated receiver entity.

Today, televisions are Internet enabled. Now televisions can receive programming over the Internet. In addition, televisions are able to transmit limited information in order to purchase programming, verify subscription services, request information, etc. Nevertheless, the television is still basically a receiving and presenting device, designed to present programming to a user for viewing.

However, if a television user wants to communicate with another, the user must access a device other than the television in order to use an electronic mail program, text-messaging system, phone service, chat program, voice over Internet program, etc. Therefore, interactive communications require users who are viewing a television to own and operate separate devices.

SUMMARY

Embodiments of the present invention are directed to a method and system of displaying electronic messages and communications at a television. An electronic message, e.g. text message, email, or communication, may be sent from a mobile device or a computer. The message travels over the Internet and is delivered to a television. The television displays a notification that a message has been received, or the television automatically displays the message for viewing by the user. A user may select the notification to view the message. In addition, the user may use the television to respond to the message, e.g. via another electronic message or communication.

In one embodiment, a method of displaying messages at a television includes: receiving an electronic communication at the television from a server, wherein: a communication channel has been established over the Internet between the television and the server; and the electronic communication is a text message or an electronic message; notifying a user that the television has received the electronic communication; and displaying the electronic communication on the television.

In one embodiment, the displaying is performed in response to a request from the user. In various embodiments, the electronic communication includes an identification of an alias associated with a sender of the electronic communication.

In further embodiments, the method includes sending a second electronic communication from the television to the server in response to the receiving. In some embodiments, the method includes storing the electronic communication in the television.

In one embodiment, the method further includes: receiving a number of incoming electronic communications; sending a number of outgoing electronic communications, and storing the number of incoming electronic communications and the number of outgoing electronic communications in the television. In further embodiments, the method includes receiving programming content at a cable host device for displaying on the television.

In another embodiment, a method of displaying messages at a television includes: establishing communication over the Internet between a television and a server; receiving a user-generated communication at the television from the server; displaying a notification on the television that the user-generated communication has been received; and displaying the user-generated communication on the television.

In some embodiments, the displaying the user-generated communication is performed in response to a request from a television user. In various embodiments, the user-generated communication is a text message or an email.

In one embodiment, the method further includes sending an outgoing electronic communication from the television to the server. In further embodiments, the method further includes storing the user-generated communication in a television storage device.

In some embodiments, the method includes: receiving a number of incoming electronic communications; sending a number of outgoing electronic communications, and storing the number of incoming electronic communications and the number of outgoing electronic communications in a television memory device. In various embodiments, the method includes receiving programming information at a cable host device for viewing on the television.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
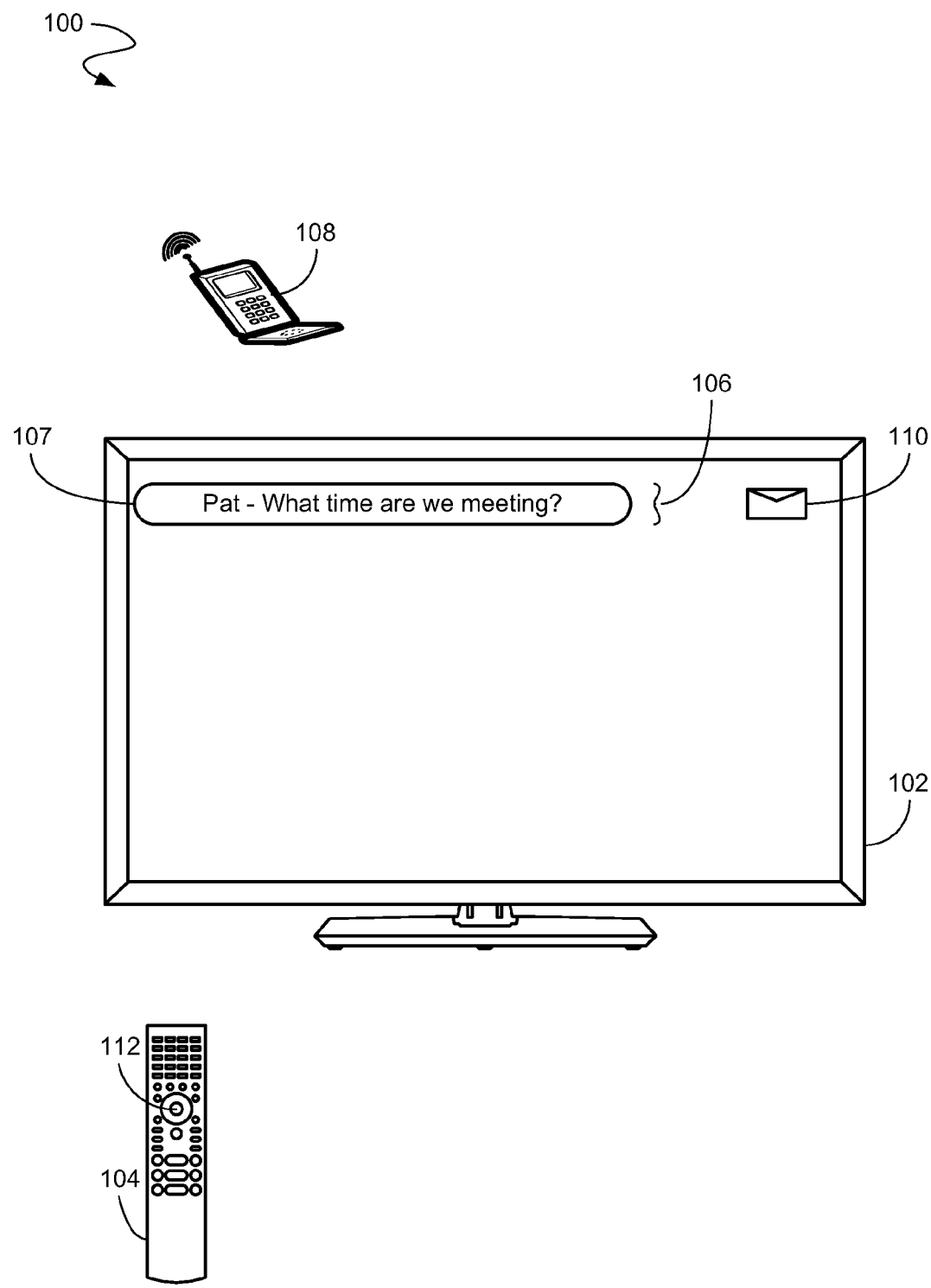
FIG. 1 is a graphical depiction of an exemplary system for displaying messages at a television, according to an embodiment of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The drawings showing embodiments of the system are semi-diagrammatic and not to scale and, particularly, some of the dimensions are for the clarity of presentation and are shown exaggerated in the drawing Figures. Also, where multiple embodiments are disclosed and described having some features in common, for clarity and ease of illustration, description, and comprehension thereof, like features one to another will ordinarily be described with like reference numerals.

Some portions (e.g. FIG. 6, FIG. 7, and FIG. 8) of the detailed descriptions, which follow, are presented in terms of procedures, steps, simulations, calculations, logic blocks, processing, and other symbolic representations of operations on data within a computer system. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Method and System for Electronic Communication to Television\

FIG. 1 is a graphical depiction of an exemplary system 100 for displaying electronic messages at a television, according to an embodiment of the present invention. The system 100 allows users to have easy access to communications, e.g. electronic mail and text messaging, while using a television. The system 100 presents on the television display communications that have been sent to the registered television user. In addition, the system 100 allows the user to respond to the communications.

A television 102 generally displays content to a user (not shown). For example, the content may be a movie, a television program, Internet streaming video, etc. The user may control the television 102 with a remote control device 104. The remote control device 104 may be any device capable of controlling the television 102 remotely, e.g. wirelessly. For example, the remote control device 104 may be an UR remote control device, a LAN remote control device, or an application on a smart phone.

While viewing the television 102 the user may receive an electronic message 106 from, for example, a mobile device 108, e.g. cell phone, or a computer (not shown). The mobile device 108 transmits the message 106, and the message 106 is received by the television 102. The television 102 may automatically display the message 106 in a message window 107 contemporaneously with the receipt thereof. In an embodiment, the user may respond to the message 106 using the television 102 and the remote control device 104.

In some embodiments, the television 102 displays a relatively unintrusive notification 110, e.g. a small icon, on the television 102. When the user is ready to view the message 106, the user selects the notification 110. For example, the user may select the notification 110 using a cursor directing device and/or a button 112 on the remote control device 104. After the notification 110 has been selected, the message 106 may then display in the message window 108.

Figure 2:
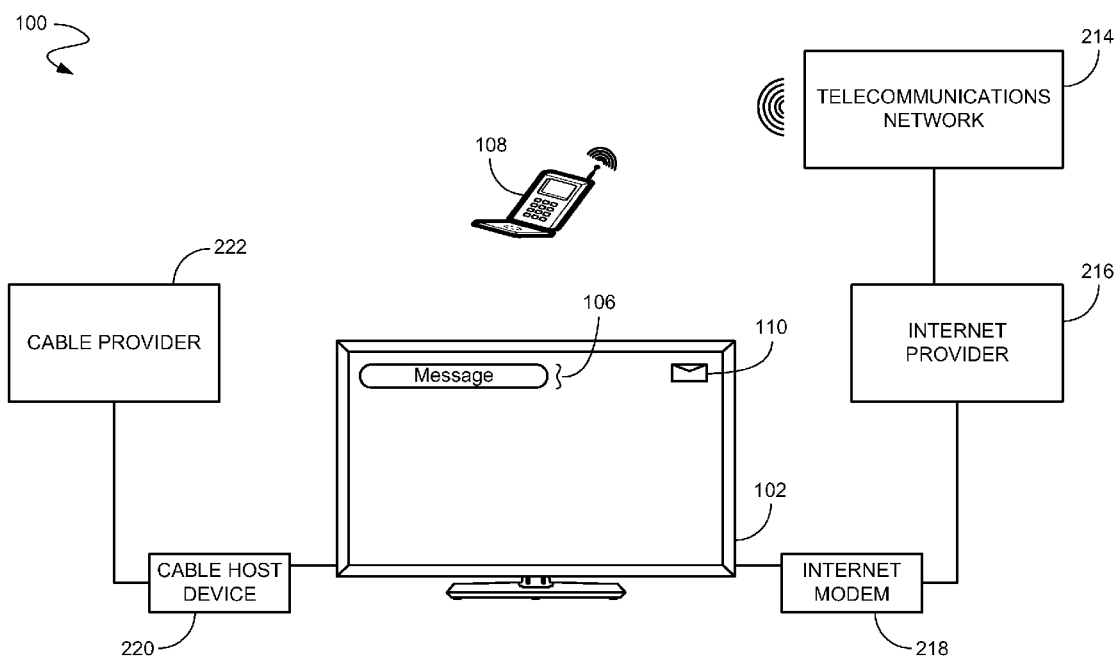
FIG. 2 is a graphical depiction in greater detail of the exemplary system for displaying messages at a television, according to an embodiment of the present invention.

FIG. 2 is a graphical depiction in greater detail of the exemplary system 100 for displaying messages at a television, according to an embodiment of the present invention. The system 100 allows users operating a television to have easy access to communications sent through a telecommunications network. The system 100 receives the communications through an Internet provider, and presents on the television display communications that have been sent to the registered television user. In addition, the system 100 allows the user to respond to the communications.

A mobile device 108 transmits an electronic message 106 to a telecommunications network 214. The telecommunications network 214 transmits the message 106 to an Internet provider 216. The Internet provider 216 transmits the electronic message 106 to an Internet modem 218. In an embodiment, the Internet modem 218 is a stand-alone device connected, e.g. wirelessly or wired, to the television 102. The television 102 then displays the message 106 and/or the notification 110. In an embodiment the television 102 stores the message 106, for example on a hard drive (not shown).

Thus, the television 102 receives the message 106 directly from the Internet. In an embodiment, the television 102 separately receives programming through a cable host device 220 that is connected to a cable provider 222. In some embodiments, the cable host device 220 is a stand-alone device connected, e.g. wirelessly or wired, to the television 102. In various embodiments (not shown), the television 102 may receive programming through other sources, e.g. an antenna or a satellite dish.

In an embodiment, the television 102 may transmit a response or original electronic message 106 to the Internet modem 218. The Internet modem 218 transmits the message 106 to the Internet provider 216. The Internet provider 216 transmits the message 106 to the telecommunications network 214. The telecommunications network 214 transmits the message 106 to the mobile device 108. Thus, users may communicate back and forth using the mobile device 108 and the television 102.

Figure 3:
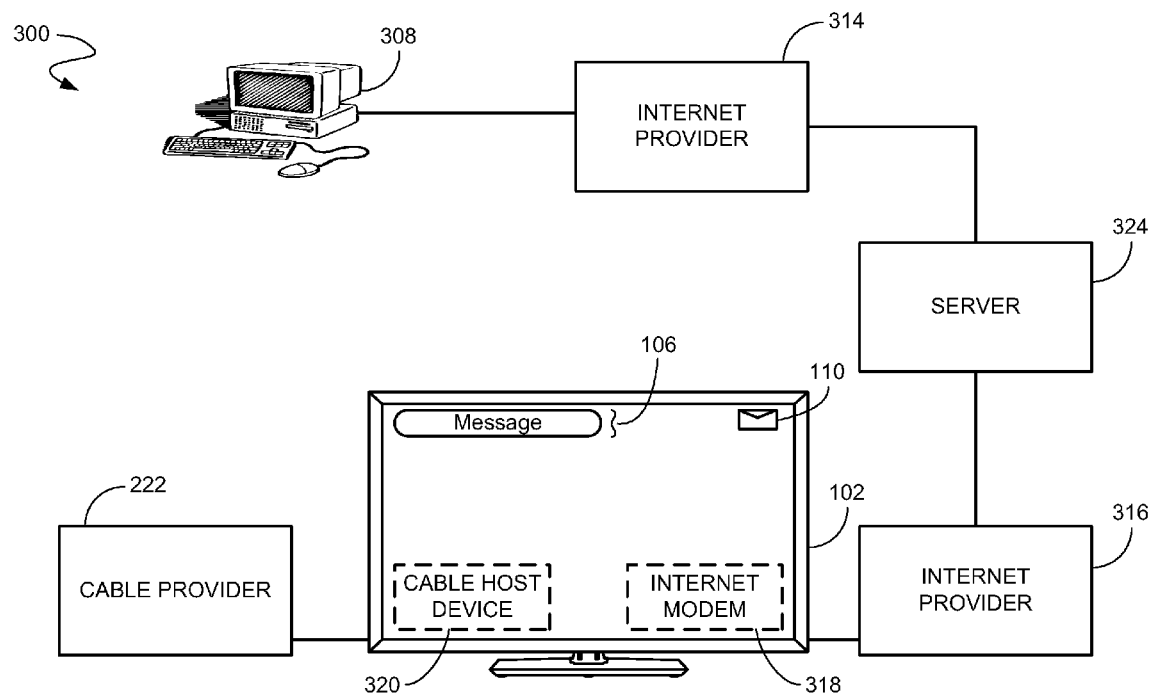
FIG. 3 is a graphical depiction of an exemplary system for displaying messages at a television that were sent from a computer and through a server, according to an embodiment of the present invention.

FIG. 3 is a graphical depiction of an exemplary system 300 for displaying messages at a television, according to another embodiment of the present invention. The system 300 allows users operating a television to have easy access to communications sent through an Internet provider. The system 300 receives the communications through a server, and presents on the television display communications that have been sent to the registered television user. In addition, the system 300 allows the user to respond to the communications.

A computer 308 transmits the message 106 to a first Internet provider 314. In some embodiments, the computer 308 may use electronic mail, instant messaging, and/or web forms to transmit the message 106. The first Internet provider 314 transmits the message 106 to a server 324. The server 324 transmits the message 106 to a second Internet provider 316. In an embodiment, the second Internet provider 316 may be identical to the first Internet provider 314.

The second Internet provider 316 transmits the message 106 to an Internet modem 318. In an embodiment, the Internet modem 318 is integrated into the television 102, e.g. a component within the television 102. The television 102 then displays the message 106 and/or the notification 110. In an embodiment the television 102 stores the message 106, for example on a hard drive (not shown).

Thus, the television 102 receives the message 106 directly from the Internet. In an embodiment, the television 102 separately receives programming through a cable host device 320 that is connected to a cable provider 222. In some embodiments, the cable host device 320 is integrated into the television 102, e.g. a component within the television 102. In various embodiments (not shown), the television 102 may receive programming through other sources, e.g. an antenna or a satellite dish.

In an embodiment, the television 102 may transmit the message 106 from the Internet modem 318 to the second Internet provider 316. The second Internet provider 316 transmits the message 106 to the server 324. The server 324 transmits the message 106 to the first Internet provider 314. The first Internet provider 314 transmits the message 106 to the computer 308. Thus, users may communicate back and forth using the computer 308 and the television 102.

Figure 4:
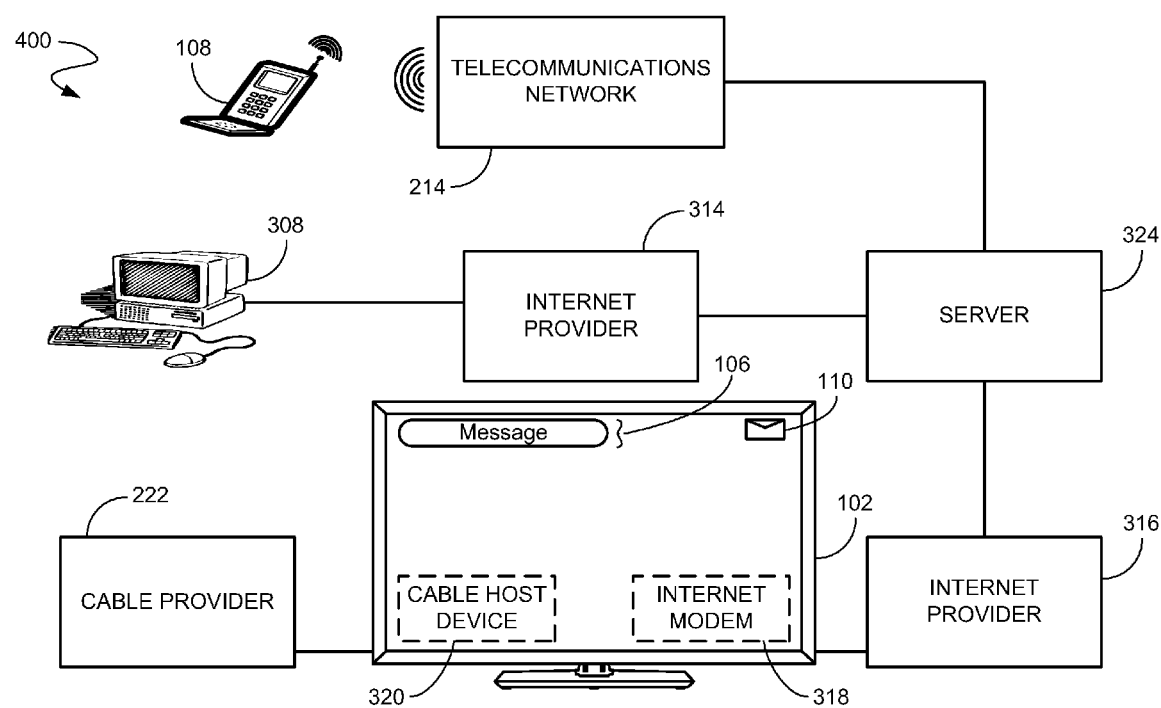
FIG. 4 is a graphical depiction of an exemplary system for displaying messages at a television that were sent either from a computer or a mobile device and through a server, according to an embodiment of the present invention.

FIG. 4 is a graphical depiction of another exemplary system 400 for displaying messages at a television, according to an embodiment of the present invention. The system 400 allows users operating a television to have easy access to communications sent through a telecommunications network and/or an Internet provider. The system 400 receives the communications through a server, and presents on the television display communications that have been sent to the registered television user. In addition, the system 400 allows the user to respond to the communications.

The computer 308 or the mobile device 108 transmits the message 106 to a first Internet provider 314 or the telecommunications network 214. The first Internet provider 314 or the telecommunications network 214 transmits the message 106 to the server 324. The server 324 transmits the message 106 to a second Internet provider 316. In an embodiment, the second Internet provider 316 may be identical to the first Internet provider 314.

In an embodiment, the server 324 may also transmit the message 106 to the computer 308 through the first Internet provider 314, or the server 324 may transmit the message 106 to the mobile device 108 through the telecommunications network 214. Thus, if the message is set from the mobile device 108, for example, the message will also be received by the computer 308, and vice versa.

In another embodiment, the television 102 may mirror the message 106 to the computer 302 or the mobile device 108. Thus, if the message is sent from the mobile device 108, for example, the message will also be mirrored on the computer 308, and vice versa. In a further embodiment, the television 102 is copied on messages sent to/from the computer 308 and to/from the mobile device 108. Thus, the television user may respond to the message 106 using, for example, the mobile device 108. The response is copied to the television 102, and a history of the conversation may be stored on the television 102, for example on a hard drive (not shown).

The second Internet provider 316 transmits the message 106 to the Internet modem 318. The television 102 then displays the message 106 and/or the notification 110. Thus, the television 102 receives the message 106 directly from the Internet. In an embodiment, the television 102 separately receives programming through a cable host device 320 that is connected to a cable provider 222.

In an embodiment, the television 102 may transmit the message 106 from the Internet modem 318 to the second Internet provider 316. The second Internet provider 316 transmits the message 106 to the server 324. The server 324 transmits the message 106 to the first Internet provider 314 and the telecommunications network 214. The first Internet provider 314 transmits the message 106 to the computer 308, and the telecommunications network 214 transmits the message 106 to the mobile device 108. Thus, users may communicate back and forth using the mobile device 108, the computer 308, and the television 102.

Figure 5:
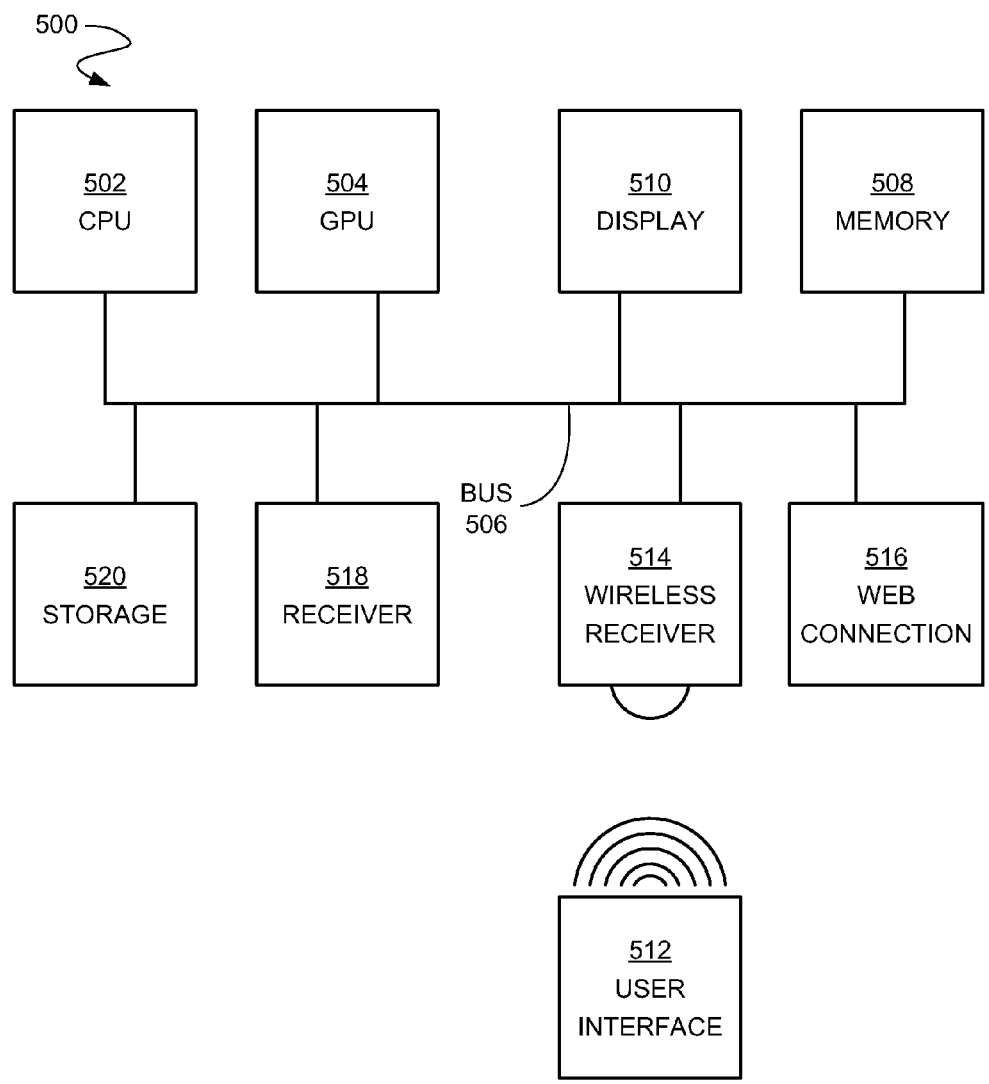
FIG. 5 is a block diagram of an example of a general-purpose television system within which a system of displaying messages at a television in accordance with the present invention can be implemented.

FIG. 5 is a block diagram of an example of a general-purpose television system 500 within which a system of displaying messages at a television in accordance with the present invention can be implemented. In the example of FIG. 5, the system includes a host central processing unit (CPU) 502 coupled to a graphics processing unit (GPU) 504 and a web connection 516 via a bus 506. One or more CPUs as well as one or more GPUs may be used. The web connection 516 may be, for example, an Ethernet port, a cable modem, a DSL modem, etc.

Both the CPU 502 and the GPU 504 are coupled to memory 508. In the example of FIG. 5, the memory 508 may be a shared memory, whereby the memory stores instructions and data for both the CPU 502 and the GPU 504. Alternatively, there may be separate memories dedicated to the CPU 502 and GPU 504, respectively. In an embodiment, the memory 508 includes the system of displaying messages at a television in accordance with the present invention. The memory 508 can also include a video frame buffer for storing pixel data that drives a coupled display device 510.

The system 500 also includes a user interface 512 that, in one implementation, includes an on-screen control device. The user interface 512 may include an I/R remote control device, a LAN remote control device, or an application on a smart phone. The user interface 512 may be a wired interface (not shown) or a wireless interface communicating to a wireless receiver 514.

In addition, the system 500 includes a receiver 518, e.g. cable host device, satellite receiver, or antenna, for receiving programming. The system 500 may also include a storage device 520, e.g. hard drive, for storing messages. Generally speaking, the system 500 includes the basic components of a television system platform that implements functionality in accordance with embodiments of the present invention.

Figure 6:
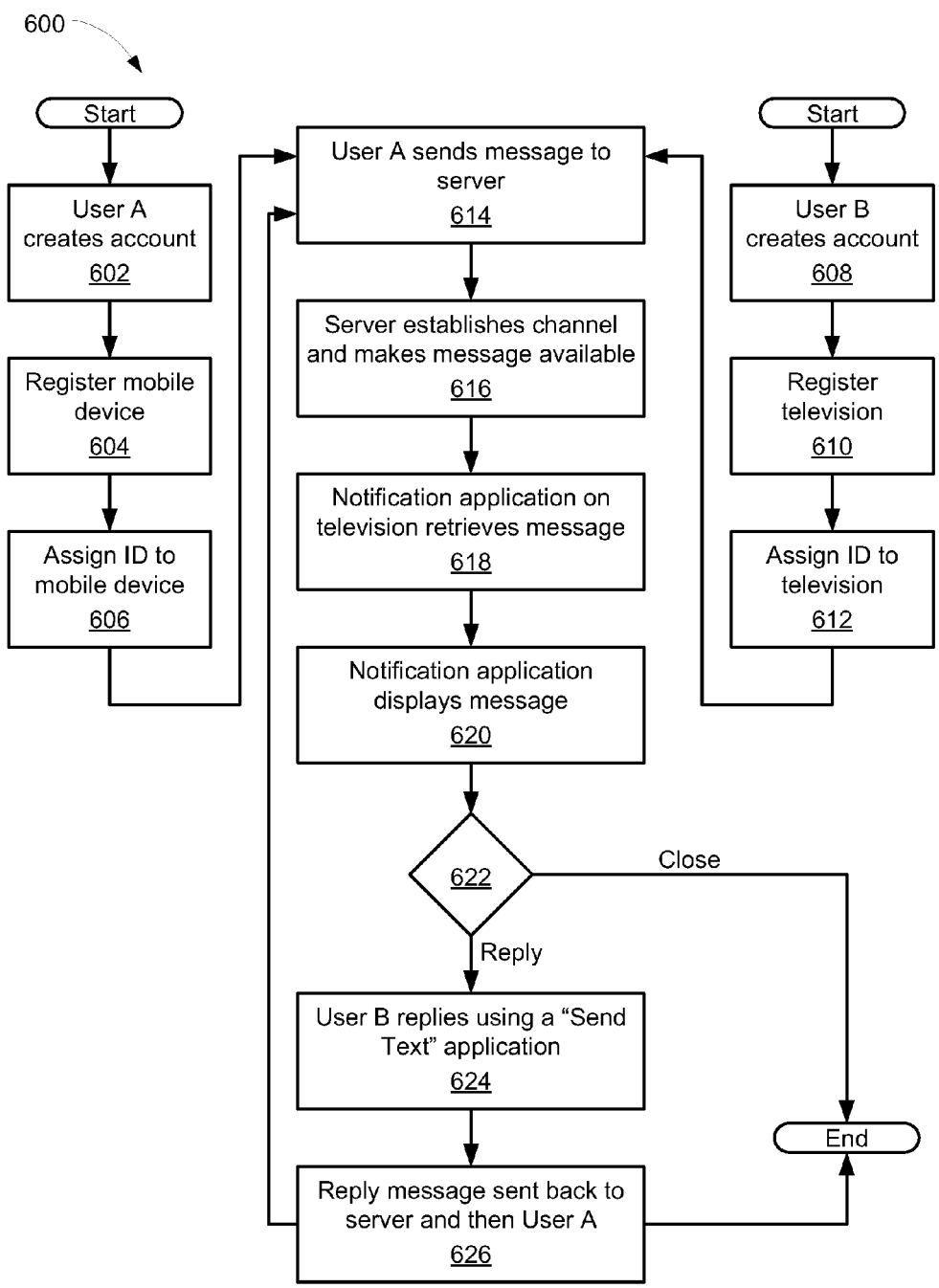
FIG. 6 depicts a flowchart of an exemplary method of server affiliation, according to an embodiment of the present invention.

In some embodiments, users may need to affiliate their devices with a host company's server in order to send or receive electronic messages as discussed herein. FIG. 6 depicts a flowchart 600 of an exemplary method of server based affiliation, according to an embodiment of the present invention. In a step 602, User A creates an account with a host company on a server, e.g. server 314 (see FIG. 4). In a step 604, User A registers a mobile device with the host company. In a step 606, the host company gives a unique ID for that mobile device.

In a step 608, User B creates an account with the host company on the server, e.g. server 314 (see FIG. 4). In a step 610, User B registers a television with the host company. In a step 612, the host company gives a unique identification, e.g. MAC addresses, etc., for that television. In some embodiments, User B may register multiple televisions and a single ID is shared for the multiple televisions. In an embodiment, steps 602, 604, 606, 608, 610, and 612 may be performed on a website.

In a step 614, User A sends a text message or an email to the server, for example using a special business number. The message includes information identifying the mobile device, details of the recipient, and the text message. In an embodiment, User A must provide a unique ID as well as User B's ID so that a communication channel may be established.

In some embodiments, aliasing may be used to help users remember their unique ID and the recipient's television ID. For example, aliases may identify the mobile device, the television, and/or the intended recipient. Thus, aliases used in the message may be automatically interpreted, for example by the server, to identify users and devices.

In a step 616, the server parses the information (e.g. identification of the mobile device, details of the recipient, and the text message) in the message, establishes a communication channel, and makes the message available on User B's television. In a step 618, a notification application on the television checks for updates and retrieves the message sent from User A. In a step 620, the notification application parses the message and displays the message on the television.

In a step 622, User B can choose to reply to the message or close the message. In a step 624, if User B chooses to reply to the message, a "Send Text" application will allow User B to type in a reply message and send. In a step 626, the reply message is sent back to the server and then to User A. For example, if User A sent a text from a cell phone, then the reply message would be a text back to the cell phone. If User A sent an email, then the reply message would be an email back to User A. In an embodiment, this cycle may repeat until the communication channel is closed.

Figure 7:
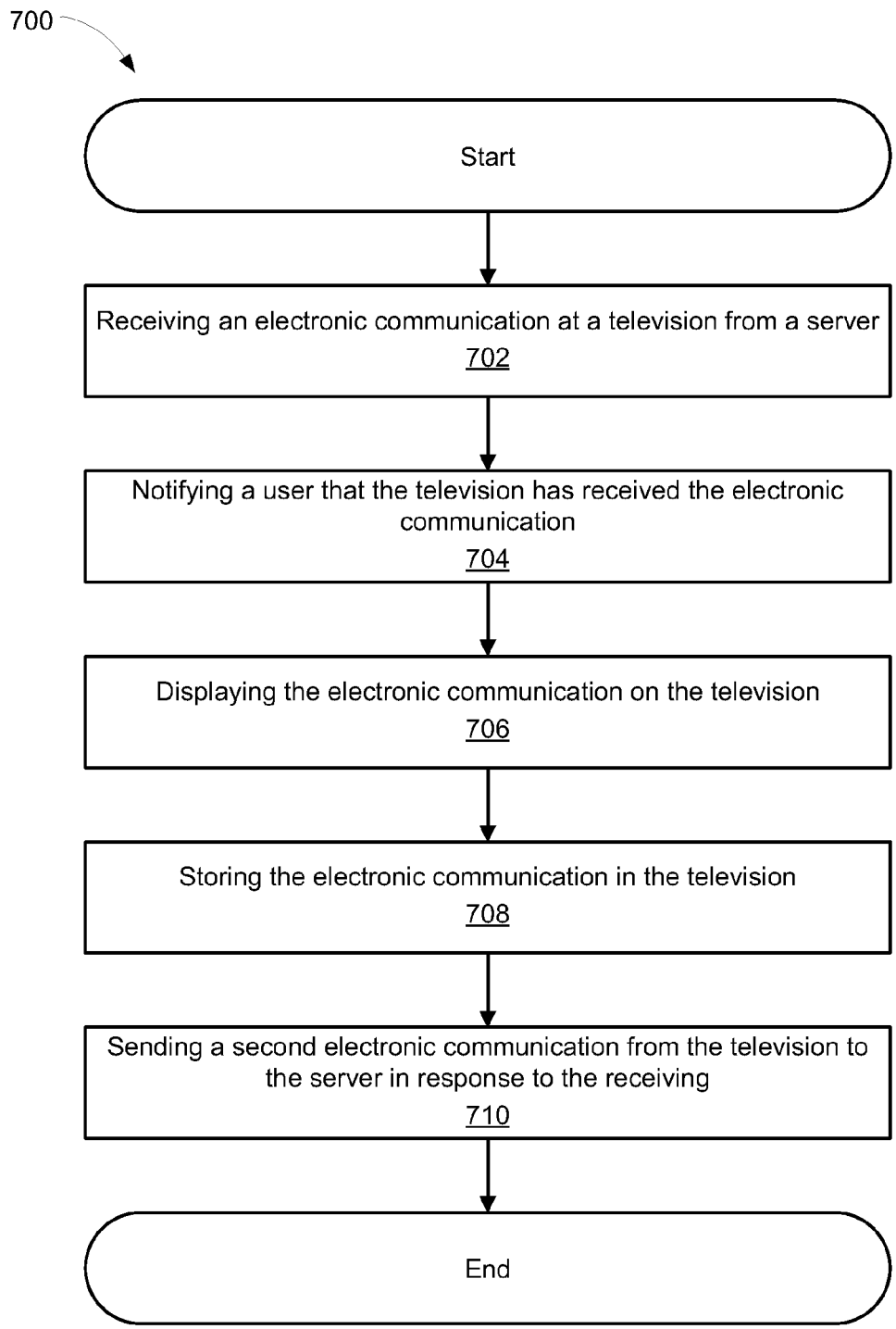
FIG. 7 depicts a flowchart of an exemplary method of displaying messages at a television, according to an embodiment of the present invention.

FIG. 7 depicts a flowchart 700 of another exemplary method of displaying messages at a television, according to an embodiment of the present invention. Although specific steps are disclosed in the flowchart 700, such steps are exemplary. That is, embodiments of the present invention are well suited to performing various other steps or variations of the steps recited in the flowchart 700.

In a step 702, an electronic communication is received at a television from a server, wherein a communication channel has been established over the Internet (e.g. using server based alias registration) between the television and the server, and the electronic communication is a text message or an electronic message. For example, in FIG. 4 an email has been sent from a computer or a mobile device over the Internet to a server. The server has established a communication channel over the Internet to a television, and the email is received at the television.

In a step 704, a user is notified that the television has received the electronic communication. For example, in FIG. 4 the message is automatically displayed and/or a notification is displayed on the television. In an embodiment, the electronic communication includes an identification of an alias associated with a sender of the electronic communication. For example, in FIG. 6 users may register with a host company and assign aliases to unique IDs for televisions, mobile devices, and/or computers.

In a step 706, the electronic communication is displayed on the television. In an embodiment, the displaying is in response to a request from the user. For example, in FIG. 4 the message is displayed on the television. The message may be displayed in response to the user making a request, e.g. selecting the notification or pressing a "view message" button.

In a step 708, the electronic communication is stored in the television. For example in FIG. 2 the message is stored on a hard drive connected to the television. In some embodiments a cable host device may also be connected to the television. The cable host device may receive programming content for displaying on the television. For example, in FIG. 4 a cable host device receives programming content from a cable provider.

In a step 710, a second electronic communication is sent from the television to the server in response to the receiving. For example, in FIG. 4 the user of the television sends a response to the message. The response is sent from the television, to the server, and then to the mobile device and/or computer.

In some embodiments the television receives a number of incoming electronic communications, sends a number of outgoing electronic communications, and stores the number of incoming electronic communications and the number of outgoing electronic communications in the television. For example, in FIG. 4 the users communicate back and forth between the television and the mobile device and/or computer. The incoming and outgoing electronic communications may be stored on an internal or external hard drive.

Figure 8:
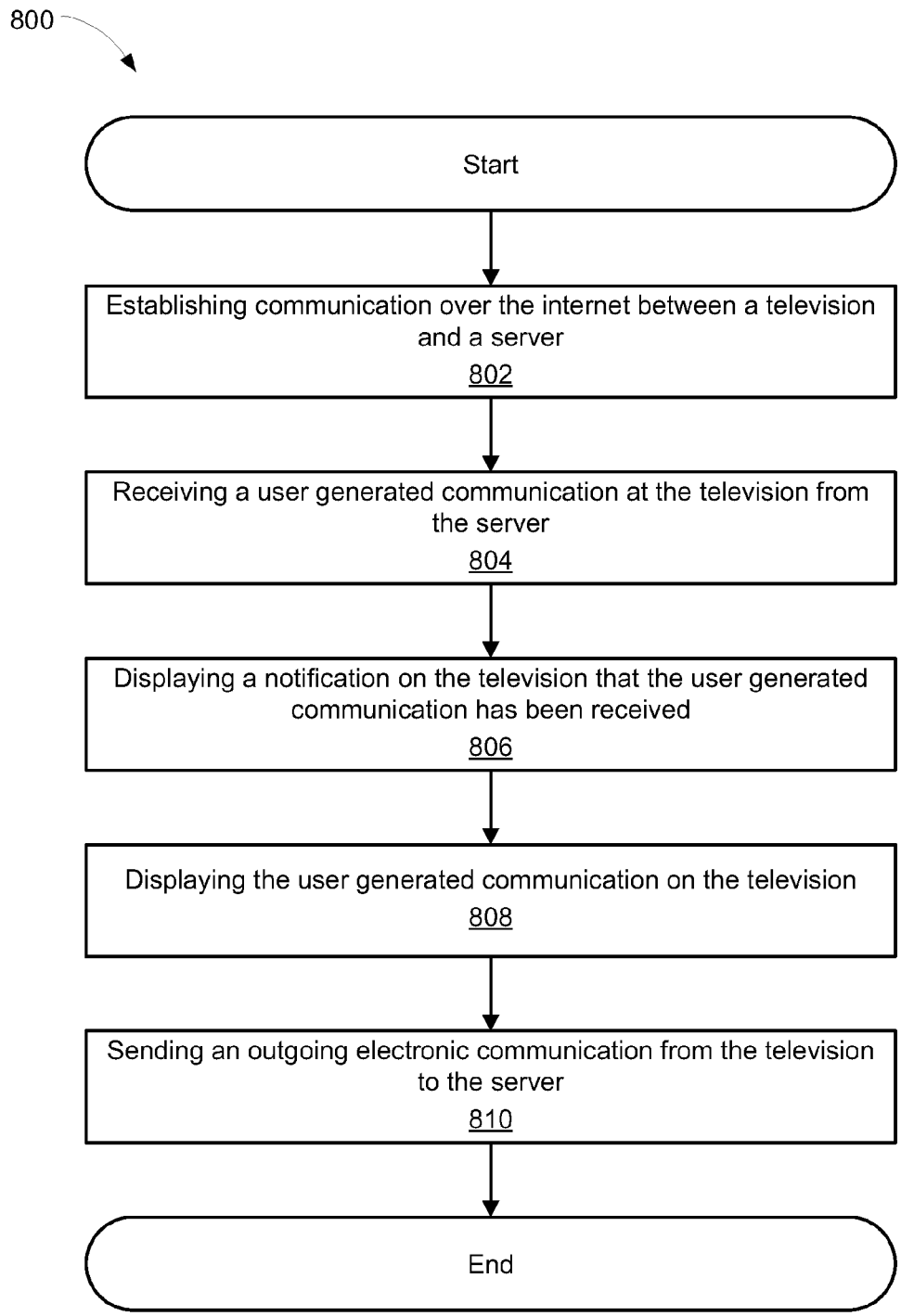
FIG. 8 depicts a flowchart of an exemplary method of displaying messages at a television, according to an embodiment of the present invention.

FIG. 8 depicts a flowchart 800 of an exemplary method of displaying messages at a television, according to another embodiment of the present invention. Although specific steps are disclosed in the flowchart 800, such steps are exemplary. That is, embodiments of the present invention are well suited to performing various other steps or variations of the steps recited in the flowchart 800.

In a step 802, communication is established over the Internet between a television and a server. For example, in FIG. 4 a server has established a communication channel over the Internet (e.g. using server based alias registration) to a television. The server communicates to an Internet provider, and the Internet provider communicates with an Internet modem at the television.

In a step 804, a user-generated communication is received at the television from the server. In an embodiment, the user-generated communication may be a text message or an email. For example, in FIG. 4 an email has been sent from a computer or a mobile device over the Internet to a server. The server has established a communication channel over the Internet to a television, and the email is received at the television.

In a step 806, a notification is displayed on the television that the user-generated communication has been received. For example, in FIG. 4 a notification is displayed on the television that an email has been received. In an embodiment, the electronic communication is stored in the television. For example in FIG. 2 the message is stored on a hard drive connected to the television. In some embodiments a cable host device may also be connected to the television. The cable host device may receive programming content for displaying on the television. For example, in FIG. 4 a cable host device receives programming content from a cable provider.

In a step 808, the user-generated communication is displayed on the television. In an embodiment, the displaying is in response to a request from a television user. For example, in FIG. 4 the message is displayed on the television. The message may be displayed in response to the user making a request, e.g. selecting the notification or pressing a "view message" button.

In a step 810, an outgoing electronic communication is sent from the television to the server. For example, in FIG. 4 the user of the television sends a response to the message. The response is sent from the television, to the server, and then to the mobile device and/or computer.

In some embodiments the television receives a number of incoming electronic communications, sends a number of outgoing electronic communications, and stores the number of incoming electronic communications and the number of outgoing electronic communications in the television. For example, in FIG. 4 the users communicate back and forth between the television and the mobile device and/or computer. The incoming and outgoing electronic communications may be stored on an internal or external hard drive.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of displaying electronic messages at a television, said method comprising:
receiving an electronic communication originated by a mobile device at said television from a server, said communication also being sent to a computing device separate from the television, wherein:
a communication channel has been established over the internet between said television and said server; and
said electronic communication is a text message or an electronic message;
using the television to mirror the user-generated communication sent to the computing device separate from the television, whereby a user-generated communication sent from the mobile device is mirrored on the television and on the computing device separate from the television such that the television is copied on user-generated communications sent to/from the computing device and to/from the mobile device;
rendering a notification that said television has received said electronic communication;
the notification not being the electronic representation but only a representation thereof;
responsive to a selection of the notification and not before,
displaying said electronic communication on said television, wherein prior to selection of the notification with the notification displayed, no text associated with the message is presented with the notification so as to not obtrude on viewing programming presented on the TV, wherein the mobile device is a stand-alone computing device capable of network access, sending messages, receiving messages, and displaying messages, all independently of a local connection to the television.

2. The method of claim 1 further comprising receiving a user display request, and wherein said displaying is in response to said user display request.

3. The method of claim 1 wherein said electronic communication includes an identification of a server based alias associated with a sender of said electronic communication.

4. The method of claim 1 further comprising sending a second electronic communication from said television to said server in response to said receiving.

5. The method of claim 1 further comprising storing said electronic communication in said television.

6. The method of claim 1 further comprising:
receiving a plurality of incoming electronic communications;
sending a plurality of outgoing electronic communications, and
storing said plurality of incoming electronic communications and said plurality of outgoing electronic communications in said television.

7. The method of claim 1 further comprising receiving programming content at a cable host device for displaying on said television.

8. A method comprising:
establishing communication over the internet between a television and a server;
receiving a user-generated communication at said television from said server, the communication also being sent to a computing device separate from the television; and
displaying said user-generated communication on said television and using the television to mirror the user-generated communication sent to the computing device separate from the television, whereby a user-generated communication sent from a mobile device is mirrored on the television and on the computing device separate from the television such that the television is copied on user-generated communications sent to/from the computing device and to/from the mobile device, so that a user of the television is enabled to respond to the user-generated communication using the mobile device, wherein the mobile device is a stand-alone computing device capable of network access, sending messages, receiving messages, and displaying messages, all independently of a local connection to the television.

9. The method of claim 8 further comprising receiving a user display request, and wherein said displaying said user-generated communication is in response to said user display request.

10. The method of claim 8 wherein said user-generated communication is a text message or an electronic message.

11. The method of claim 8 further comprising sending an outgoing electronic communication from said television to said server.

12. The method of claim 8 further comprising storing said user-generated communication in a television storage device, and wherein said user-generated communication includes an identification of a server based alias associated with a sender of said user-generated communication.

13. The method of claim 8 further comprising: receiving a plurality of incoming electronic communications; sending a plurality of outgoing electronic communications, and storing said plurality of incoming electronic communications and said plurality of outgoing electronic communications in a television memory device.

14. The method of claim 8 further comprising receiving programming information at a cable host device for viewing on said television.

15. An audio video display device (AVDD), comprising:
a display;
a processor configured for controlling the display; and
a computer readable storage medium accessible to the processor and bearing instructions which when executed by the processor configure the processor for:
receiving an electronic communication originated from a mobile device from a server over a communication channel that has been established over the internet between the AVDD and the server, said communication also being sent to a computing device separate from the AVDD, with the electronic communication being a text message or an electronic message;
using the AVDD to mirror the user-generated communication sent to the computing device separate from the AVDD, whereby a user-generated communication sent from the mobile device is mirrored on the AVDD and on the computing device separate from the AVDD such that the AVDD is copied on user-generated communications sent to/from the computing device and to/from the mobile device;
rendering a notification that the AVDD has received the electronic communication, with the notification not being the electronic representation but only a representation thereof; and
responsive to a selection of the notification and not before, displaying the electronic communication on the AVDD, wherein prior to selection of the notification with the notification displayed, no text associated with the message is presented with the notification so as to not obtrude on viewing programming presented on the AVDD wherein the mobile device is a stand-alone computing device capable of network access, sending messages, receiving messages, and displaying messages, all independently of a local connection to the AVDD.

\* \* \* \* \*